United States Patent [19]

Owens et al.

[11] Patent Number: 5,020,776
[45] Date of Patent: Jun. 4, 1991

[54] SPLIT SEAT GATE VALVE

[75] Inventors: Brian S. Owens, Hancock; Alvin A. Kimpel, Edgerton, both of Wis.

[73] Assignee: Warman International, Inc.

[21] Appl. No.: 532,954

[22] Filed: Jun. 4, 1990

[51] Int. Cl.⁵ .............................................. F16K 3/02
[52] U.S. Cl. .................................... 251/327; 251/328
[58] Field of Search .............. 251/326, 327, 328, 358, 251/359

[56] References Cited

U.S. PATENT DOCUMENTS

| | | |
|---|---|---|
| 2,669,416 | 2/1954 | Hilton . |
| 2,732,170 | 1/1956 | Shand . |
| 2,829,862 | 4/1958 | Wey . |
| 2,851,051 | 9/1958 | Englert et al. . |
| 2,870,987 | 1/1959 | Greenwood . |
| 2,885,174 | 5/1959 | Setka . |
| 2,893,684 | 7/1959 | Williams et al. . |
| 2,914,294 | 11/1959 | Beatty . |
| 2,942,841 | 6/1960 | Stillwagon . |
| 3,000,608 | 9/1961 | Williams . |
| 3,033,517 | 5/1962 | Rovang et al. . |
| 3,333,816 | 8/1967 | Williams et al. . |
| 3,350,056 | 10/1967 | Blumenkranz . |
| 3,350,058 | 10/1967 | Alden . |
| 3,401,915 | 9/1968 | Kim . |
| 3,463,447 | 8/1969 | Ripert . |
| 3,710,816 | 1/1973 | Prince . |
| 3,844,531 | 10/1974 | Grengs . |
| 3,897,043 | 7/1975 | McBain et al. . |
| 3,921,957 | 11/1975 | Freeman . |
| 3,945,604 | 3/1976 | Clarkson . |

(List continued on next page.)

OTHER PUBLICATIONS

Product Bulletin 20-23: The Clarkson KGA Valve, The Clarkson Company, 3430 W. Bayshore Road, Palo Alto, Calif., 94303.
Series D Flexgate Slurry Knife Gate Valve, Red Valve Company, Inc., P.O. Box 548, Carnegie, Pa., 15106.
KGA Valve Selection and Ordering Guide, The Clarkson Company, P.O. Box 12037, Reno, Nev. 89510-2037.
Bulletin 070287-A: L & M Valve Company M-100 Series, L & M Valve Company, Division of Alphabet, Inc., P.O. Box 964, 1390 Southside Dr., Salem, Va., 24153.
Bulletin 120688: L&M Valve M-300 Series, L&M Valve, Division of Technaflow, Inc., P.O. Box 964, Salem, Va. 24153.
Unival, Incorporated UV 100 Series, Keystone Sales, Denver, Colo.
NewCon Knife Gate Slurry Valves, NewCon Co., 605 W. 37th Street, P.O. Box 489, Hibbing, Minn. 55746.
Clarkson KGC Wafer-Type Knife-Gate Valves, The Clarkson Company, P.O. Box 12037, Reno, Nev. 89510-2037.

Primary Examiner—John C. Fox
Attorney, Agent, or Firm—Lathrop & Clark

[57] ABSTRACT

A gate valve assembly has two aligned and connected body housing members which each have a gate slot above a through passage which is above a seat portion slot. Gaskets are compressed by the body housing members to form a liquid-tight seal along the valve sides. Two resilient valve liners are fitted between and compressed by the body housing members. Each valve liner has a body with a planer front face and a cylindrical through passage which extends through the liner body. A seat portion extends downwardly from the body of each liner and increases in thickness as it extends from the body. The valve liners are compressed within the body housing members such that the planar front faces are adjacent one another and the seat portions are compressed within the seat portion slots to produce a tight seal along the bottom of the valve assembly. A packing filled chamber at the top of the assembly forms a tight seal at the top of the valve. An imperforate gate is slideable through the gate slots to alternatively obstruct and permit fluid flow through the valve. The seat portions extend to the bottom of the valve such that particles trapped between the seat portions may be expelled from the valve between the seat portions.

19 Claims, 7 Drawing Sheets

U.S. PATENT DOCUMENTS

| | | |
|---|---|---|
| 3,945,606 | 3/1976 | McDonald . |
| 3,993,092 | 11/1976 | Still . |
| 4,007,911 | 2/1977 | Clarkson . |
| 4,009,717 | 3/1977 | Bailey . |
| 4,051,863 | 10/1977 | Still . |
| 4,112,969 | 9/1978 | Still . |
| 4,163,544 | 8/1979 | Fowler et al. . |
| 4,201,365 | 5/1980 | Paptzun et al. . |
| 4,257,447 | 3/1981 | Clarkson . |
| 4,377,274 | 3/1983 | Mayhew, Jr. . |
| 4,491,144 | 1/1985 | Dreyer et al. . |
| 4,505,453 | 3/1985 | Barbe et al. . |
| 4,522,224 | 6/1985 | Stalder et al. . |
| 4,603,864 | 8/1986 | Raftis . |
| 4,688,597 | 8/1987 | Clarkson et al. . |
| 4,703,915 | 11/1987 | King . |
| 4,742,990 | 5/1988 | Stalder et al. . |
| 4,765,361 | 8/1988 | Clifford . |
| 4,773,627 | 9/1988 | King et al. . |
| 4,798,365 | 1/1989 | Mayhew . |
| 4,846,442 | 7/1989 | Clarkson et al. . |
| 4,895,181 | 1/1990 | McKavangh .................. 251/327 X |

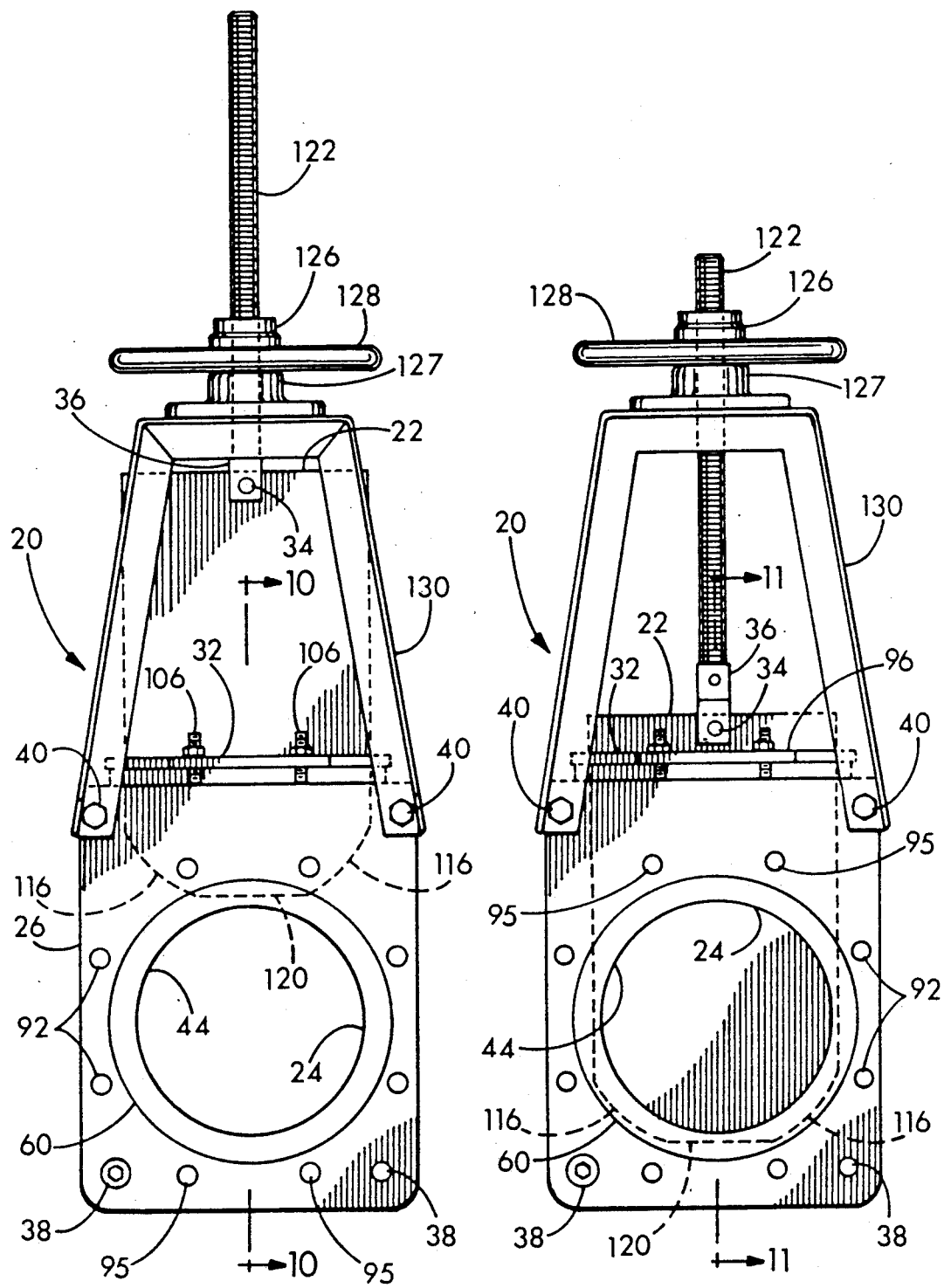

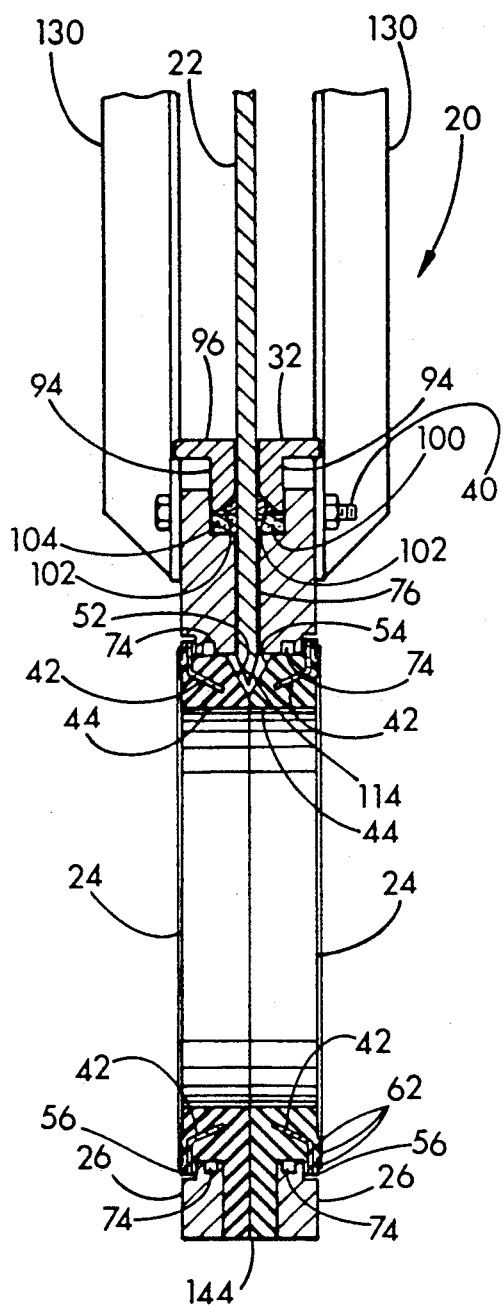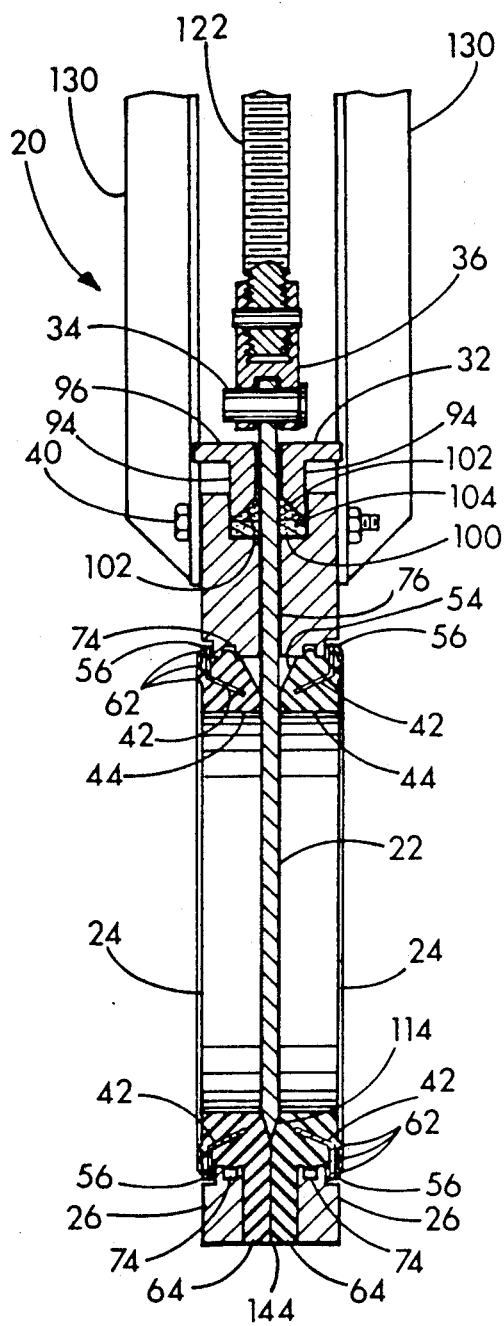
FIG. 10
FIG. 11

SPLIT SEAT GATE VALVE

FIELD OF THE INVENTION

This invention relates to gate valves in general and to split-seat knife gate valves in particular.

BACKGROUND OF THE INVENTION

Knife gate valves are used to control the flow of liquids or slurries through pipe systems. Conventional gate valves have a knife gate which is a plate with a rectangular or semi-circular edge which is movable from a valve open position in which the flow through the valve is not blocked and a valve closed position which blocks flow. Seated gate valves provide a groove or protrusion within the valve body into which the blade of the knife gate seats within or against in order to block liquid flow and provide a tight seal. Conventional seated gate valves have a number of drawbacks. First, particulate matter contained in the controlled liquid will tend to become trapped beneath the gate valve within the seat each time the valve is cycled. Over a period of time this trapped particulate matter may build up resulting in a jammed valve which will not fully seal. Furthermore, the groove or protrusion of the seat within the valve introduces obstructions to the flow of the controlled liquid or slurry which consequently reduces the velocity and pressure of the controlled fluid. As a typical pipe system will contain numerous valves, the combined reductions in fluid velocity can be significant.

Seatless gate valves are known which avoid build-up of particulate matter within the seats by providing an opening beneath the gate to the outside of the valve. One known seatless gate valve has resilient valve liners with protruding annular lips which are compressed under considerable pressure against one another to seal the valve in the open position. This valve is closed by driving the gate between the compressed valve liners to spread the liners to admit the gate. At the end of its travel the knife blade is embedded between the valve liners to close the valve. Beneath the annular lips which are pressed against the knife gate to seal the valve, the valve is open to the exterior, with no place for particle build-up. While this seatless gate valve avoids jams due to particle buildup, it permits a significant quantity of liquid to escape from the valve to the environment during cycling. A valve which releases such quantities of liquid is unacceptable in many applications, for example in the processing of food products, where sanitary conditions are required at all times. Furthermore, because the seatless valve liners are under such substantial compressive loads, they are subject to rapid deterioration with cycling.

What is needed is a gate valve which will not reduce the velocity of the controlled liquid, which does not leak during cycling, which permits the escape of particles trapped beneath the gate, and which may endure repeated cycling without failure of the valve liners.

SUMMARY OF THE INVENTION

The gate valve assembly of this invention has a top, a bottom and two sides and has two body housing members which have coaxial through passages and means connecting the members together in end-to-end relation. The housing members have portions defining a gate slot for admitting a gate between the housing members and a seat portion slot located beneath the through passages and the gate slot. Resilient sealant means are located between the body housing members and are compressed by the body housing members to form a liquid-tight seal on the two sides of the valve. Two resilient valve liners are fitted within the housing members. Each valve liner has a body with a cylindrical through passage and a generally cylindrical outer surface which engages within the through passage of a housing member, a planar front surface and a seat portion which extends downwardly from the body. The seat portion increases in thickness as it extends from the body and has a front face which extends from the front surface of the body. The valve liners are adjacent one another within the housing members such that the planar front surfaces of the valve liners are adjacent and contacting one another and the seat portions are compressed within the seat portion slots to form a tight seal along the bottom of the valve. The valve liner cylindrical passages are aligned within the body housing members. A packing chamber is formed by the two housing members above the valve liners. The packing chamber is filled with a compressible packing material which is compressed by a packing compressor which extends into the packing chamber to form a tight seal around the gate. An imperforate gate is slidable through the gate slot between a valve open position wherein the gate does not block fluid flow through the aligned valve liner passages and a valve closed position wherein the gate passes between the valve liners which engage the gate in fluid-tight contact to prevent any fluid flow. The packing material, the resilient sealing means, and the seat portions form a liquid-tight seal surrounding the valve liner passages in both the valve open and valve closed positions. The seat portions of the valve liners extend to the bottom of the valve such that particles trapped between the seat portions may be expelled from the valve between the seat portions. The gate is a rectangular plate with a double-beveled blade which has radiused corners connected by a straight blade portion.

It is an object of the present invention to provide a gate valve which requires reduced force to open and close.

It is a further object of the present invention to provide a gate valve which will not leak during cycling.

It is another object of the present invention to provide a gate valve which, when open, does not significantly reduce the velocity of the liquid flowing through it.

It is also an object of the present invention to provide a gate valve which may eject particulate matter trapped beneath the blade without losing fluid.

It is a still further object of the present invention to provide a gate valve in which the resilient valve liners are under reduced compressive loads.

It is yet another object of the present invention to provide a gate valve with extended life valve liners which are not subjected to excessive concentrated loads.

Further objects, features, and advantages of the invention will be apparent from the following detailed description when taken in conjunction with the accompanying drawings.

BRIEF DESCRIPTION OF THE DRAWINGS

In the drawings:

FIG. 1 is a front elevational view of the knife gate valve assembly of this invention in a valve open position.

FIG. 2 is a front elevational view of the gate valve of FIG. 1 in a valve closed position.

FIG. 10 is a cross-sectional view of the open valve of FIG. 1 taken along section line 10—10.

FIG. 11 is a cross-sectional view of the closed valve of FIG. 2 taken along section line 11—11.

DESCRIPTION OF THE PREFERRED EMBODIMENT

Figure 3:
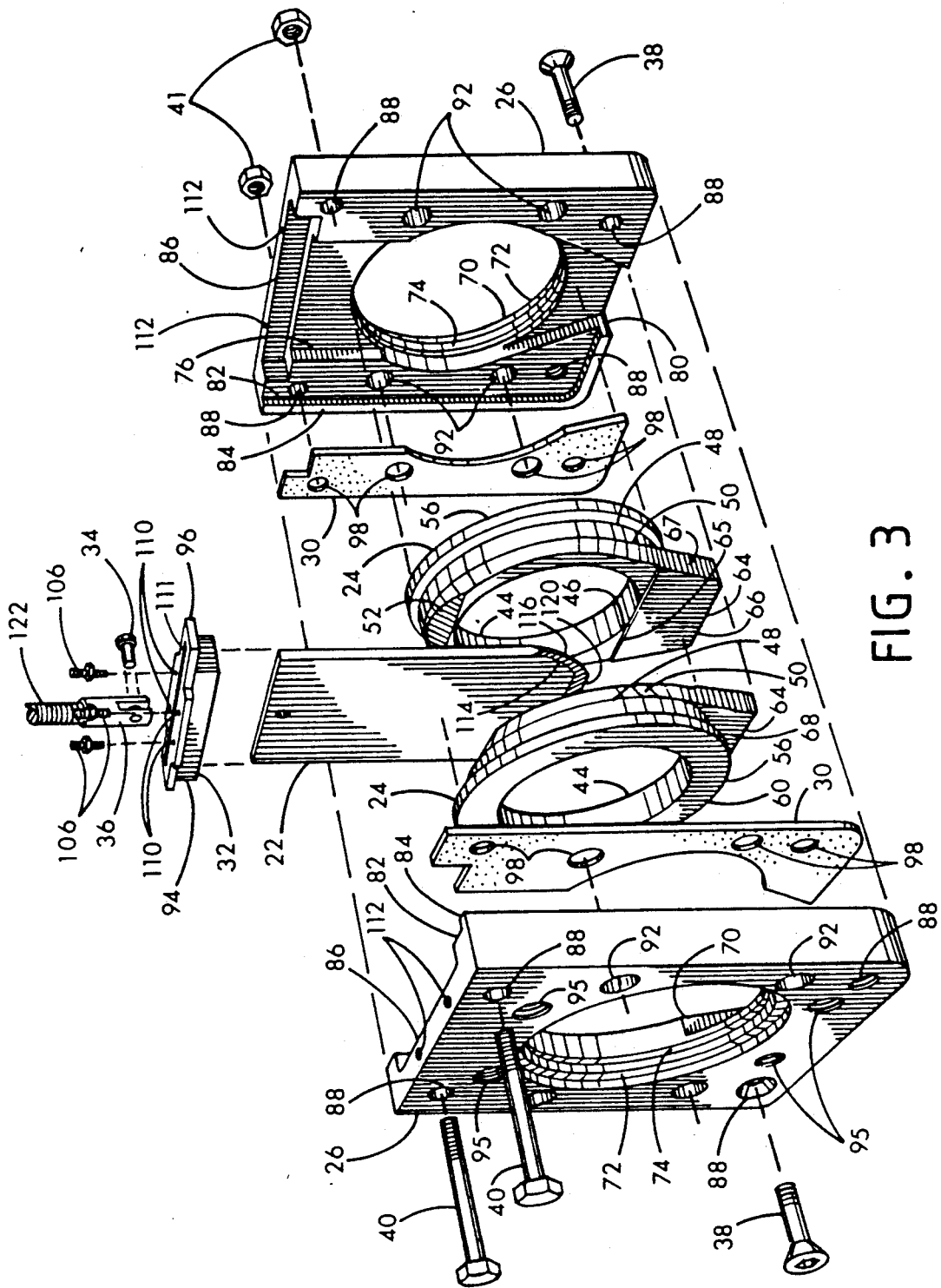
FIG. 3 is a perspective exploded view of the valve of FIG. 1.

Referring more particularly to FIGS. 1–11 wherein similar numbers refer to similar parts, a gate valve assembly 20 is shown in FIGS. 1-3, and 8-11. As best seen in FIG. 3, the split-seat gate valve assembly 20 has a gate 22 located between two valve liners 24 which form a split seat for the gate in the valve closed position. The valve liners are contained within two valve housing members 26 which have gaskets 30 on either side of the valve liners 24. The gate 22 moves through a packing compressor 32. The gate 22 is attached by a clevis pin 34 to the clevis 36. Fasteners 38, 40 retain the housing members 26 in compressive attachment to form a liquid-tight valve assembly 20.

Figure 9:
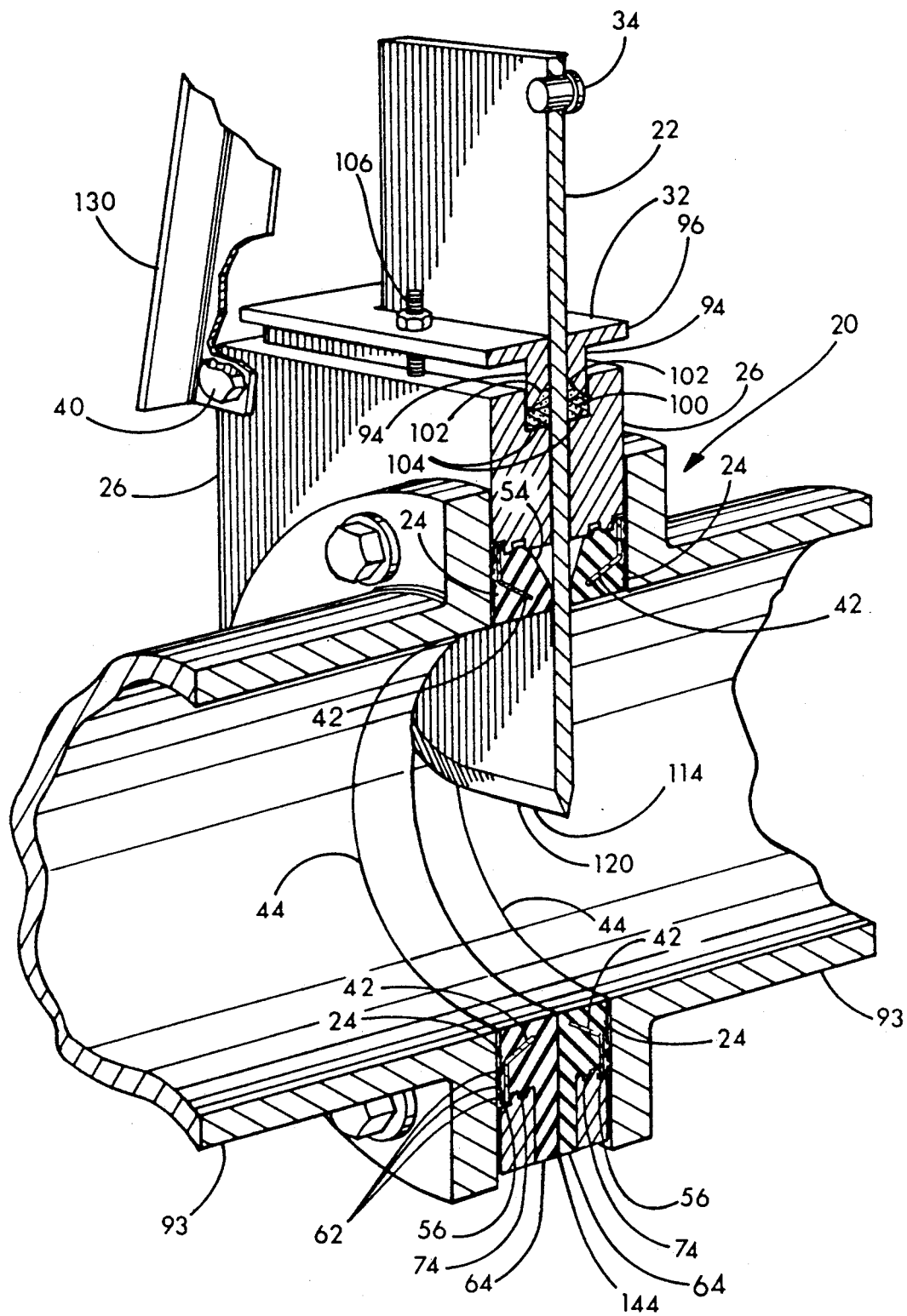
FIG. 9 is an isometric cross-sectional view of the valve and piping assembly of FIG. 8 with the knife gate in an intermediate closed position.

The valve liners 24, best shown in FIGS. 3–6, are formed of an appropriate resilient material, preferably natural gum rubber, and have embedded within them a rigid stiffening ring 42. The stiffening ring 42 is preferably spin-formed carbon steel and is preferably embedded in the valve liner 24 through a process of transfer molding. Each valve liner 24 is symmetrical about a vertical axis, hence the two valve liners required for a single gate valve assembly 20 are identical and interchangeable. Each valve liner 24 is generally annular with a cylindrical central bore 44. The central bores 44 are straight-through and unobstructed. No obstacles to the flow are presented by the interior of the valve liner thus the valve assembly in an open position does not reduce the velocity of the controlled liquid, and there are no protrusions on which solids may collect or disturb the flow. A planar front face 46 is substantially perpendicular to the axis of the valve liner central bore 44. The body 48 of the liner is generally cylindrical with an outer wall 49 which is concentric with the central bore 44 of the valve liner 24 and perpendicular to the front face 46 of the valve liner 24. An inclined bevel 50 joins the outer wall 49 to the front face 46. The bevel 50 is inclined at about 52 degrees from the front face. A planar entry face 52 is formed at the top of the valve liner 24 and is inclined from the front face 46 at approximately 57 degrees. The entry faces 52 are formed so that when the two valve liners 24 are placed with their front faces 46 in contact, the entry faces 52 form a V-shaped entry groove 54, best shown in FIG. 10. This linear entry groove 54 provides an extended contact area for the gate 22 to enter between the valve liners 24. A flange 56 extends from the body 48 of the valve liner 24 and is substantially parallel to the front face 46 and surrounds the periphery of the body 48. The rear face 60 is generally planar and parallel to the front face of the valve liner 24 and extends over the rear of the body 48 and the flange 56. Three narrow concentric annular seal ridges 62 preferably protrude from the rear face 60. The seal ridges 62 are shown in FIGS. 5, 6, and 9-11, but have been omitted from FIGS. 1-3 for increased clarity. The seal ridges 62 are compressed by attached pipe flanges to form a liquid-tight seal between the valve liners and the attached pipes 93. In FIG. 9 the flanges 56 of the liners 24 and the pipes 93 have been depicted with a slight separation in order to illustrate the protruding seal ridges 62. When the pipes 93 are fully connected to the valve assembly 20 the ridges will be compressed nearly flat and the pipes will make contact with the surfaces of the flanges 56.

Figure 4:
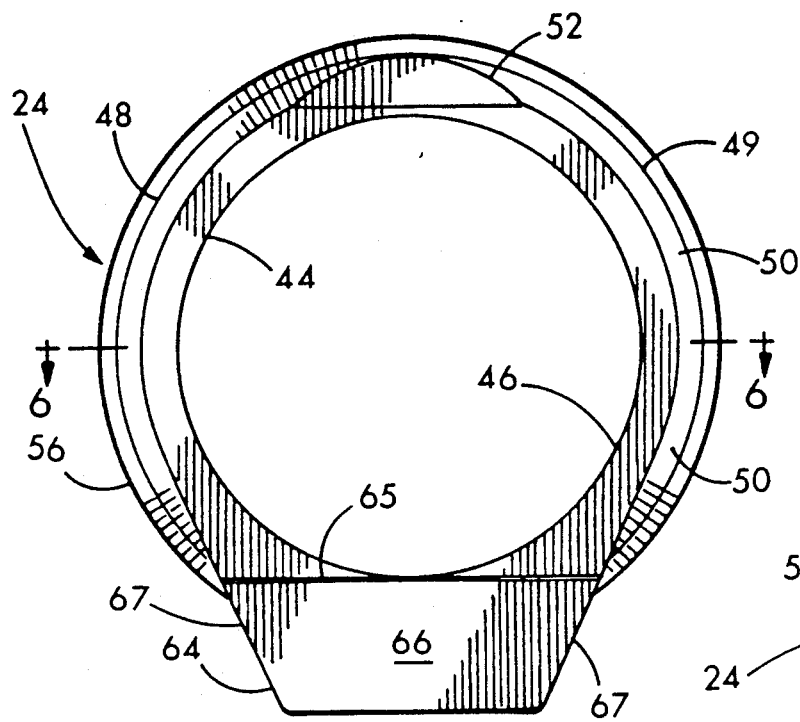
FIG. 4 is a front elevational view of a resilient valve liner for the gate valve of FIG. 1.
Figure 5:
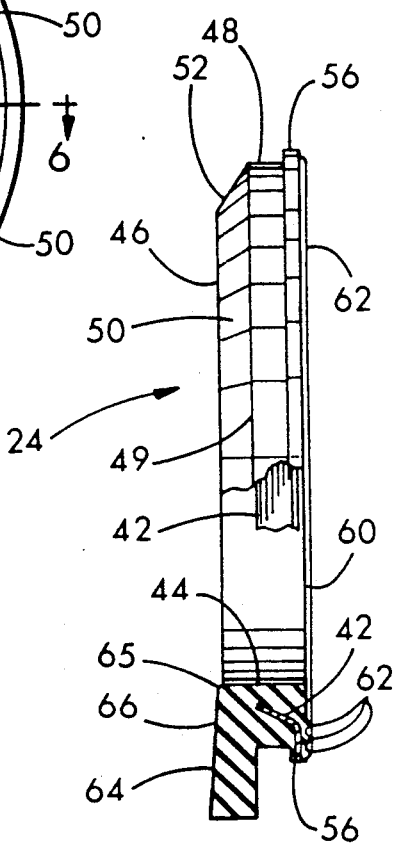
FIG. 5 is a side elevational view of the valve liner of FIG. 4 broken away in partial section.
Figure 6:
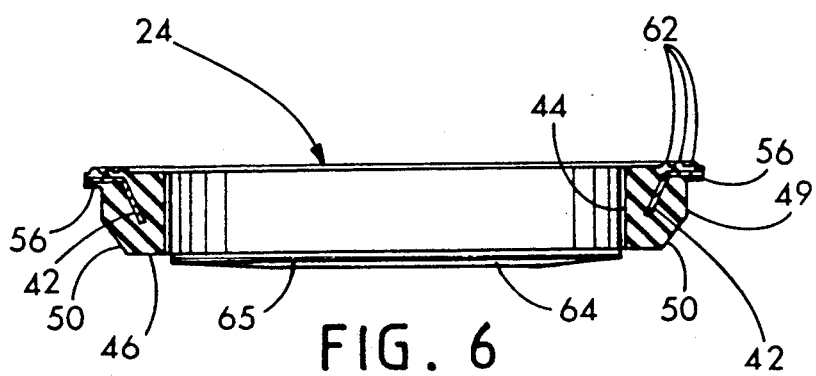
FIG. 6 is a cross-sectional view of the valve liner of FIG. 4 taken along section line 6—6.

A resilient seat portion 64, best shown in FIGS. 4–6, is integrally formed as a part of the valve liner 24 and extends from the front face 41 and the bevel 50 of the body 48. A protruding ridge 65 marks the top of the seat portion 64 and runs tangent to the central bore 44 of the liner. The ridge 65 joins the front surface 66 of the seat portion 64 and is inclined outwardly slightly from the plane of the front face 46. In a valve liner 24 with a central bore 44 of eight inches, for example, the bottom of the seat portion would extend approximately one-eighth of an inch beyond the plane of the front face 46 of the linear 24. The rear surface 68 of the seat portion 64 extends from the outer wall 49 of the body 48 and is substantially parallel to the front face 46 of the liner 24. Because the front surface 66 inclines outwardly from the rear surface 68, the thickness of the seat portion 64 increases as it is more distant from the liner body 48. This protrusion of the seat portion 64 results in a gradually increasing amount of compression of the seat portions 64 of the two face-to-face valve liners 24 mounted in the valve housing members 26. The seat portions 64 of the two valve liners 24 together form a seat for the gate 22 in the valve closed position. In addition to providing a seat for the gate 22, the seat portions extend downward beyond the body 48 to provide a seal which will not allow liquids to escape but will permit the gradual expulsion of particulate matter. The sides 66 of the seat portion 64 extend from the body and are inclined towards one another so the seat portion is wider towards the middle of the liner than at the bottom.

The stiffening ring 42, best shown in FIG. 5, has a peripheral portion which is located within the flange 56 of the valve liner 24 and a frustoconical rim which extends within the body 48 of the valve liner 24. The ring is surrounded by and bonded to the elastic material of the valve liner 24 on all surfaces except for the areas which extend along the periphery of the flange 56 of the liner. As a result of this encasement the metal of the stiffening ring 42 is nowhere in contact with the controlled liquid and is hence not susceptible to corrosion by the liquid. The ring is very stiff and is substantially undeformed by the pressure exerted on the liners by the insertion of the gate 22. The stiffening ring 42 acts to maintain the shape of the valve liner 24 and limit inward compression of opposing valve liners 24 when pipes are attached to the valve assembly 20.

The valve housing members 26, best shown in FIG. 3, are two interchangeable cast and machined parts of a suitably strong material preferably ductile iron. Each valve housing member 26 has a central bore 70 which has a peripheral flange ledge 72 on the exterior of the valve housing member 26. The flange ledge 72 retains the flange 56 of a valve liner 24.

An expansion groove 74 is located within the bore 70 inwards of the flange ledge 72. The expansion groove 74, as shown in cross section in FIGS. 10 and 11, provides space for the valve liners 24 in the assembled gate valve assembly 20 to expand when the valve liners 24 are compressed by the insertion of the gate 22 between the two valve liners 24.

A gate slot 76 runs perpendicular to the central bore 70 and is dimensioned to permit the gate 22 to be easily raised and lowered. A seat portion slot 80 is located beneath the gate slot 76 and the central bore 70 and has inclined sides to accept the seat portion 64 of a valve liner 24. Each valve housing member 26 has a gasket pocket 82 machined on one side of the central bore 70. Towards the outside of the valve housing member 26 the gasket pocket 82 is surrounded by a lip 84 which is preferably a little more than three quarters the thickness of an uncompressed gasket 30. On the interior of the valve housing the gasket pocket 82 is open to the gate slots 76, the central bore 70, and the seat portion slot 80. A packing chamber slot 86 is located above the gate slot 76. The packing chamber slots 86 of the connected housing members form a packing chamber 100 into which the packing compressor 32 is inserted.

Each gasket 30 is generally flat and is preferably formed of insertion rubber surrounding a fabric core. The gaskets 30 have a number of holes 98 to permit the valve housing fasteners 38, 40 and the pipe fasteners 47 to pass through the gasket. A gasket 30 is located in each gasket pocket 82 of the valve assembly 20. The depth of the gasket pockets 82 determines and controls the amount of compression that is applied to the gaskets 30 by the two connected valve housing members 26. The lips 84 also prevent portions of the gaskets 30 from being extruded between the valve housing members 126 to the exterior of the valve assembly 20.

Figure 8:
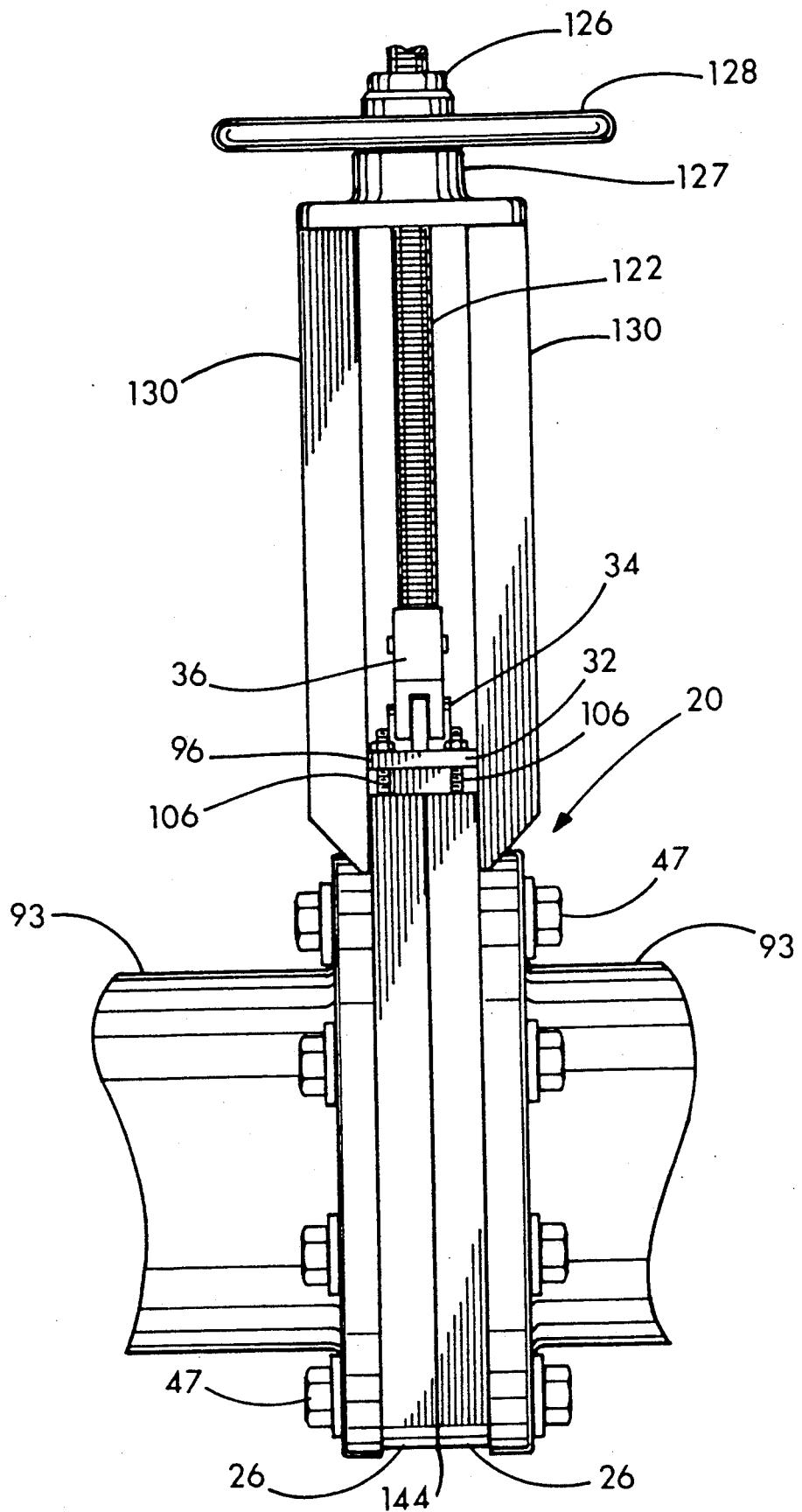
FIG. 8 is a side elevational view of the closed gate valve of FIG. 2 with aligned pipes attached on either side of the gate valve.

Fastener holes 88 are located at the corners of each valve housing to accept fasteners 38, 40 to permit alignment of the two valve housing members 26 as they are drawn tightly together. The holes 88 at the tops of the valve housing members 26 are untapped and the fasteners 40 are secured with nuts 41. One of the holes 88 on the bottom of each housing member is countersunk, and the other is tapped so the fasteners 38 do not project beyond the valve housings 26 to interfere with any attached pipes. Fastener holes 92, 95 are equally spaced around the central bore 70 for attachment of conventional pipes 93 to the exterior of the valve. The pipes 93 shown in FIGS. 8 and 9 are connected to the valve assembly 20 by fasteners 47 and are coaxially aligned with one another and the central bores 44 of the two valve liners 24 to provide a through passage of constant radius through the valve. The stiffening ring 42 which extends within the flange 56 of each valve liner 24 effectively controls the amount of compression which can be applied to the liners by tightening the pipe flanges against the valve liner flanges. Regardless of the pressure applied to the valve liner flanges 56, the stiffening ring 42 will not travel beyond the flange ledge 72—effectively setting a limit on the compressive force which may be applied to the valve liners 24. To avoid compromising a liquid-tight seal, the fastener holes 95 which are in line with the gate slots 76 and the seat portion slots 80 are tapped blind holes and do not pierce the valve housing members 26. The remaining fastener holes are through holes which align with holes 98 in the gaskets 30.

The packing compressor 32 has four vertical walls 94 with a flange 96 which extends from the top of the vertical walls. The vertical walls 94 of the packing compressor 32 extend into the packing chamber 100. The vertical walls 94 have an interior bevel 102 of about 45 degrees. Two strips of packing material 104 are layered within the packing chamber 100 surrounding the gate 22 and are compressed beneath the packing compressor 32. The two strips of packing material 104 may be any appropriate packing but are preferably formed of a braided packing material such as GFO manufactured by Gore Fiber. The packing material 104 is looped within the packing chamber 100 so the unconnected joints of the two ends of each strip of packing material do not overlap one another. The packing material 104 is compressed in the packing chamber 100 around the gate 22 by adjustable fasteners 106 passing through untapped holes 110 in the flange 96 of the packing compressor 32 into tapped holes 112 in the valve housing members 26. The flange extends inwardly of the vertical walls 94 to define an opening or slot 111 for the passage of the gate 22 through the packing compressor 32.

The gate 22 is a generally rectangular flat plate preferably formed of 316 stainless steel or 317 low molybdenum stainless steel. The gate 22 has a double-beveled blade edge 114 formed at its lower end. In the preferred embodiment the bevel is approximately one half inch deep all along the blade edge 114. The blade edge 114 is radiused to remove sharp edges which would tend to cut or abrade the valve liners 24. The thickness of the gate will vary depending on the size of the gate and the strength of the material used but, for example, for an eight inch diameter central bore 44, the gate 22 would be approximately two-fifths of an inch thick. The gate 22 along the blade edge 114 has wide radiused corners 116, with a radius slightly larger than the radius of the central bore 44 of the valve liners 24. The wide radiused corners 116 of the gate 22 assure sufficient area of contact with the valve liners 24 to form an effective seal when the gate is closed. The straight portion 120 of the blade edge 114 which joins the two radiused corners 116 is approximately as long as the entry groove 54 in the valve liners 24 which in the preferred embodiment is approximately one-half the diameter of the central bore 44 of the valve liners 24. The gate is connected to a gate actuator mechanism which may be a hydraulic or pneumatic cylinder or, as illustrated in the preferred embodiment, a hand wheel and stem assembly. The gate 22 is connected to a threaded valve stem 122 by a clevis 36 which is held in place by a clevis pin 34. The valve stem 122 runs through a cap 27, a hand wheel 128, and a stem nut 126 which are supported by two actuator support frames 130, best shown in FIGS. 1, 2, and 8, which are bolted to the valve housing members 26 and which support the gate 22 when the valve 20 is in an open position.

Although compressed rubber will provide a good seal, if repeatedly subjected to intense compressive forces, it will eventually lose resilience and compression set, with a resultant loss of liquid tightness. For this reason it is undesirable to have the front faces 46 of the liners 24 in too tight a contact with one another within the valve 20. The valve liners 24 in the open valve do not maintain a tight seal at fluid pressures commonly encountered by gate valves—typically 150 psi—thus the seal is provided by other portions of the valve assembly 20. As shown in the schematic diagram of FIG. 7—where areas of liquid-tight seals are indicated by shading—the front faces 46 which contact one another at 132 are adjacent to one another but are under nominal compression. The front faces do not form a liquid-tight seal at expected operating pressures when the gate 22 is raised and the valve 20 is in an open position. The only portions of the valve liners 24 which form a tight seal are the compressed seat portions 64 which form a seal 134 along the bottom of the valve. During cycling of the valve liquid may pass the valve liners 24 to enter the circular channel 136 formed by the bevels 50 on the valve liners 24 and may also enter the gate slots 76 of the valve housing members 26 surrounding the raised gate 22. Liquid is prevented from leaving the gate valve assembly 20 by the cooperative effect of the gaskets 30 which provide liquid-tight seals 140 on the sides of the valve, the compressed packing material 104 within the packing chamber 100 which provides a top seal 142 to the valve, and the seat portions seal 134, which provide a seal along the bottom of the valve.

Because the valve liners 24 are not required to maintain a liquid-tight seal when in the valve open position, the force required to split the valve liners 24 to admit the gate 22 is greatly reduced over the amount which would be required to split liners under sufficient pressure to retain a liquid-tight seal at the operating pressures. As a result of the lowered force required, not only is the lifetime of a set of valve liners extended, but the overall cost of an automatic gate valve which utilizes a hydraulic or pneumatic actuator is greatly reduced, due to the need for a less powerful hydraulic or pneumatic actuator.

Figure 7:
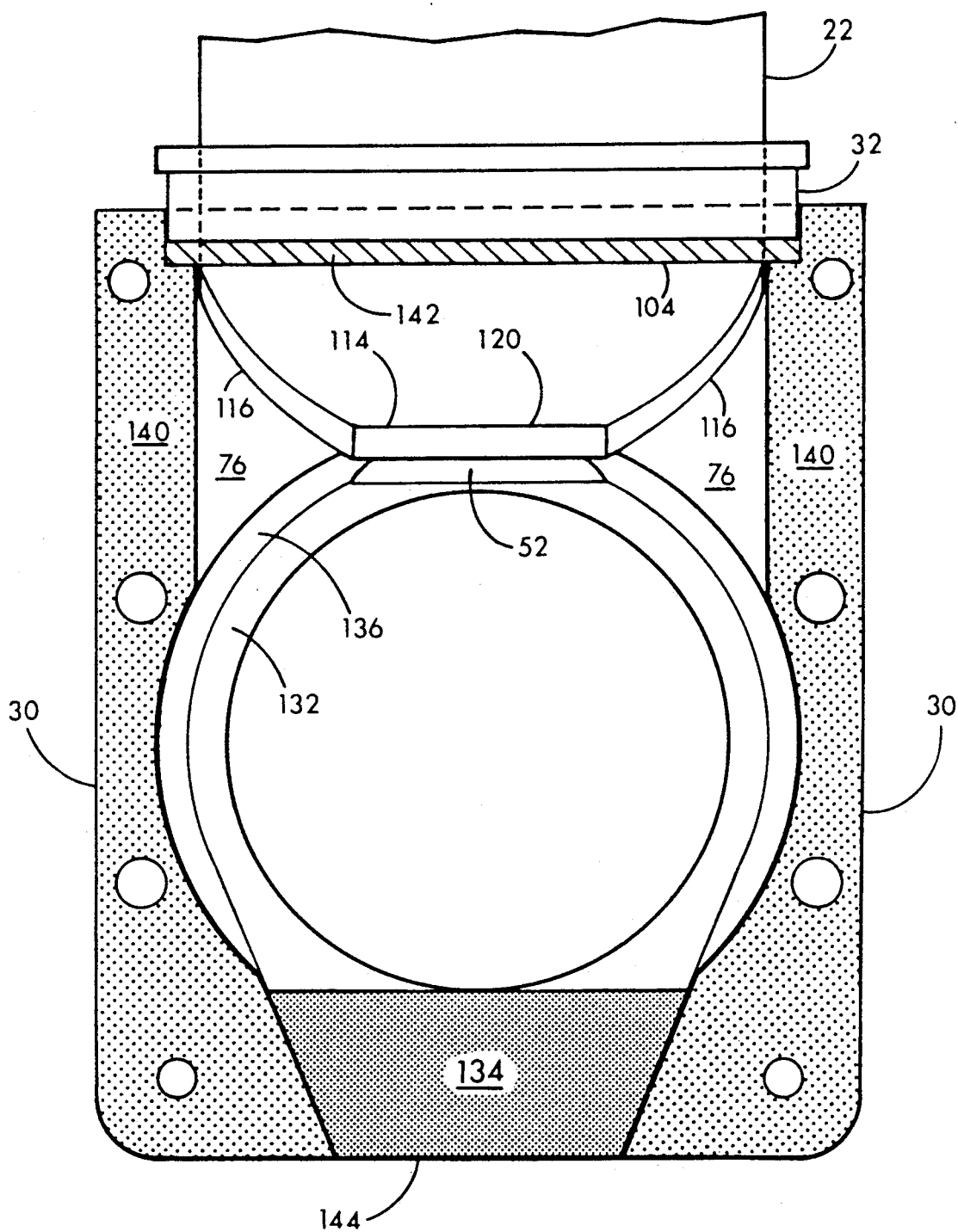
FIG. 7 is a schematic view of the gate valve of FIG. 1 in a valve open position with shaded areas showing the portions of the valve assembly forming a liquid-tight seal in the valve open position.

As shown in FIGS. 7 and 10, when the valve 20 is in the valve open position the gate 22 is held above the entry faces 52 of the valve liners 24 which together define the linear entry groove 54.

To close the valve 20 the gate 22 is lowered by rotating the hand wheel 128 which drives the valve stem 122 and gate 22 into the entry groove 54 formed between the two valve liners 24. The straight portion 120 of the blade edge 114 of the gate plate 22 is substantially as long as the entry groove 54 and acts to part the resilient valve liners 24 along the entire length of the straight portion 120. When the gate 22 enters the fluid (not shown) flowing through the valve assembly 20, the fluid is prevented from exiting the valve at the top of the valve by the gaskets 30 and the packing material 104. As shown in FIG. 9, when the gate 22 presses apart the rubber of the elastic valve liners 24, portions of the valve liner body 48 along the outer wall 49 are extended into the expansion grooves 74 formed in the valve housing members 26. The stiffening rings 42 act to deflect the deformed rubber into the expansion grooves 74. On entry, the straight portion 120 of the blade edge 114 of the gate 22 hits the full length of the entry groove 54 at once, opening the valve liners 24 and fully entering the liners without blowout or leakage from the valve. Furthermore, because of the contact along the full length of the straight portion 120 intense pressures or high bearing stress on the rubber of the liners 24 is avoided and wear is reduced, prolonging the lifetime of the liners.

As the gate 22 passes into the liquid, it is subjected to increasing forces which act to displace the blade edge 114. If the blade edge 114 is not aligned with the seam between the two seat portions 64 of the valve liners 24 when it is seated, there is a tendency to nick or cut the elastic material of the valve liners 24. The force acting to deflect the gate 22 is proportional to the surface area of the gate 22 exposed to the flowing liquid. The gate 22 is supported at the top by the compressed packing 104 and along the sides by the valve liners 24. The contact of the valve liners 24 on the sides of the gate 22 counteracts the tendency of the gate 22 to be deflected by the flowing liquid. The greater the amount of the gate 22 which is clasped between the valve liners 24, the less the gate 22 will be deflected. The amount of gate surface area exposed to the flow for a particular position of the gate is reduced from that which would be experienced by a semi-circular blade edge 114 due to the straight portion 120 which connects the radiused edges 116 of the blade edge 114. The chord of a circle which is not present beyond the straight portion 120 represents reduced surface area for the flowing fluid to act upon. The resultant increased stiffness and alignment of the gate 22 results in less wear on the valve liners 24.

In the valve closed position, shown in FIGS. 2, 8 and 11, the gate 22 is clasped by the resilient valve liners 24 along its sides. The front faces 46 provide a wide contact area with the gate 22. The blade edge 114 is embedded between the valve liners 24, with the straight portion 120 seated between the seat portions 64. When compressed by the inserted gate 22, the valve liners 24 form a sufficiently tight seal to prevent leakage of liquid from one face of the gate 22 to the other.

When the gate 22 enters the valve liners 24 between the seat portions 64, the compressed seat portions 64 prevent significant amounts of liquid from escaping through the base of the gate valve assembly 20 at the seat exit 144.

Due to the symmetry of the valve assembly 20, the pressurized working fluid may enter the valve from either side.

When the valve assembly 20 is used to interrupt the flow of a slurry or other particle-laden liquid, particles such as dirt, small pebbles, chips, or other material, may become lodged beneath the descending gate 22 and pressed into the valve liners 24 between the seat portions 64. Over a number of cycles, a continual build-up of particles beneath the blade edge 114 of the gate 22 will result in the lower particles being driven further downward between the seat portions 64 and will result in the eventual expulsion of the particles from the valve 20 at the seat portion exit 144. Because the valve housing members 26 are open at the seat portion slots 80 particulate matter is not prevented from being entirely ejected from the gate valve assembly 20. As the entire length of the seat portion 64 is under a compressive load when the seat portions 64 are pushed open by the exiting particulate matter, the remainder of the seat portion 64 will remain closed and leakage of the working fluid will be avoided.

It is important to note that, due to the light concentrated compressive loads experienced by the valve liners, materials other than rubber, such as viton, neoprene, chlorobutyle, nitrile, and others may be used to form the liners. This wide variety of elastomeric material options permits the gate valve assembly to be adapted to varying economic and environmental conditions. Furthermore, the valve housing members 26 may be formed of any suitably strong material such as dough molded compound, sheet molded compound or stainless steel types for corrosive environments.

It should be noted that the hand wheel actuator may be replaced with a pneumatic or hydraulic actuator for raising and lowering the gate 22. Furthermore, the valve may be produced to accommodate conduits of larger or smaller diameter. The proportions of the valve assembly will vary to take into account the distribution of forces which result from a larger or smaller valve liner interior bore diameter. For example, as the bore diameter increases, it may be necessary to increase the thickness of the gate or to utilize a higher strength material for the gate.

It is understood that the invention is not confined to the particular construction and arrangement of parts herein illustrated and described, but embraces such modified forms thereof as come within the scope of the following claims.

We claim:

1. A gate valve assembly having a top, a bottom, and two sides, comprising:
   (a) two body housing members having coaxial through passages and means connecting the members together in end-to-end relation, the housing members having portions defining a gate slot for admitting a gate between the housing members and a seat portion slot located beneath the through passages and the gate slot;
   (b) resilient sealing means located between the body housing members and compressed by the body housing members to form a liquid-tight seal on the two sides of the valve;
   (c) two resilient valve liners fitted within the housing members, each valve liner having a body with a cylindrical through passage and a generally cylindrical outer surface which engages within the through passage of a housing member, a planar front face and a seat portion which extends downwardly from the body and which increases in thickness as it extends from the body, the seat portion having a front surface which extends from the front face of the body, wherein the valve liners are adjacent one another within the housing members such that the planar front faces of the valve liners are adjacent and contacting one another and the seat portions are compressed within the seat portion slots to form a tight seal along the bottom of the valve, and the liner cylindrical passages are aligned;
   (d) a packing chamber formed by the two housing members above the valve liners and filled with a compressible packing material;
   (e) an imperforate gate slidable through the gate slot formed between the two housing members between a valve open position wherein the gate does not block fluid flow through the aligned valve liner passages and a valve closed position wherein the gate passes between the valve liners and is engaged by the valve liners in fluid-tight contact to prevent any fluid flow; and
   (f) a packing compressor extending into the packing chamber and compressing the packing material therein to form a liquid-tight seal around the gate, the packing compressor having an opening to permit the gate to slidably pass through the compressor, wherein the packing material, the resilient sealing means, and the seat portions form a liquid tight seal in both the valve open and valve closed positions, and wherein the seat portions extend to the bottom of the valve such that particles trapped between the seat portions may be expelled from the valve between the seat portions.

2. The gate valve assembly of claim 1 wherein each housing member has portions defining a recessed gasket pocket on one side of the through passage and the resilient sealing means comprise generally flat resilient gaskets located within the gasket pockets of each housing member and compressed by the opposing housing member to form a liquid-tight seal along the sides of the valve; and portions of the housing members form a peripheral lip along a side of each gasket and prevent the extrusion of portions of the gaskets from between the housing members.

3. The gate valve assembly of claim 1 wherein the valve liner body has a beveled side surface extending from the front face to the outer surface.

4. The gate valve assembly of claim 1 wherein the gate is substantially rectangular with a generally uniform thickness and has a double-beveled blade formed at one end, the blade having radiused corners joined by a straight blade portion, wherein the radius of the corners is greater than the radius of the liner through passages.

5. The gate valve assembly of claim 4 wherein the valve liners have portions defining a planar surface inclined away from the planar front face so that the two adjacent valve liners form a V-shaped groove beneath the packing chamber and wherein the straight portion of the gate blade is approximately as long as the V-shaped groove so formed, wherein the blade of the gate in the valve open position is located above the planar surfaces of the V-shaped groove.

6. The gate valve assembly of claim 1, wherein the packing compressor has four vertical walls and a top surface extending outwardly from the vertical walls to form a flange for adjustably connecting the packing compressor to the housing members, and the top surface extends inwardly to form a slot for the unobstructed movement of the gate within the packing chamber, and wherein the vertical walls have an interior bevel for compressing the packing material within the packing chamber.

7. The gate valve assembly of claim 1 further comprising a resilient flange extending from the body of each valve liner and an annular flange ledge is formed in each of the body housing members surrounding the through passages, wherein the flanges of the valve liners are engaged on the flange ledges of the body housing members.

8. The gate valve assembly of claim 7 further comprising a rigid ring embedded within the body of each valve liner and extending through the flange of the valve liner, wherein the rigid ring within the flange limits the compression which may be applied to the valve liners by attached pipes.

9. The gate valve assembly of claim 1 further comprising an expansion groove within a body housing member encircling the through passage of the housing member such that when the valve liners are compressed by the gate in the closed position the resilient material of the valve liners may be displaced to extend into the expansion groove.

10. The gate valve assembly of claim 9 further comprising a rigid stiffening ring embedded within the valve liner so as to direct the resilient material displaced by the gate in the valve closed position into the expansion grooves.

11. The gate valve assembly of claim 1 wherein the seat portions of the valve liners have sides which are inclined such that the seat portion is narrower at the bottom of the valve assembly then at the front face of the valve liner.

12. The gate valve assembly of claim 1 further comprising a means for raising and lowering the gate to open and close the valve.

13. A gate valve assembly, comprising:
(a) two housing members having coaxial through passages and connected together in end-to-end relation, the housing members having portions defining a gate slot for admitting a gate between the housing members and a packing chamber located directly above the gate slot;
(b) two valve liners engaged within the coaxial through passages of the valve housing members, each valve liner having a cylindrical through passage, a planar front surface, and portions defining a planar surface inclined away from the planar front surface and the first and second valve liner are placed adjacent one another within the housing members so the inclined planar surfaces form a linear V-shaped groove between the valve liners for receiving the blade of a gate;
(c) a gate with a double beveled blade formed at one end of the gate, the blade having radiused corners joined by a straight blade portion, wherein the radius of the corners is greater than the radius of the liner passages and the straight portion is approximately as long as the groove formed by the liner inclined planar surfaces;
(d) side sealing means located between and compressed by the housing members to form a liquid-tight seal on both sides of the liners;
(e) a packing compressor located above the valve housing members and within the packing chamber and adjustably fastened to the valve housing members;
(f) a strip of packing material located within the packing chamber surrounding the gate and compressed by the packing compressor;
(g) wherein the gate is slidable through the packing chamber and the gate chamber between a valve open position where the blade rests within the groove and does not block fluid flow through the through passages of the valve liner and a valve closed position where the knife edge of the gate is interposed between the valve liners to block fluid flow through the valve liner passages.

14. The gate valve assembly of claim 13 further comprising a resilient flange extending from the body of each valve liner and an annular flange ledge is formed in each of the body housing members surrounding the through passages, wherein the flanges of the valve liners are engaged on the flange ledges of the body housing members.

15. The gate valve assembly of claim 14 further comprising a rigid ring embedded within the body of each valve liner and extending through the flange of the valve liner, wherein the rigid ring within the flange limits the compression which may be applied to the valve liners by attached pipes.

16. The gate valve assembly of claim 13 further comprising an expansion groove within a body housing member encircling the through passage of the housing member such that when the valve liners are compressed by the gate in the closed position the resilient material of the valve liners may be displaced to extend into the expansion groove.

17. The gate valve assembly of claim 16 further comprising a rigid stiffening ring embedded within the valve liner so as to direct the resilient material displaced by the gate in the valve closed position into the expansion grooves.

18. The gate valve assembly of claim 13 wherein the seat portions of the valve liners have sides which are inclined such that the seat portion is narrower at the bottom of the valve assembly then at the front face of the valve liner.

19. The gate valve assembly of claim 18 further comprising a means for raising and lowering the gate to open and close the valve.

* * * * *